US008883657B2

(12) United States Patent
Hassan et al.

(10) Patent No.: US 8,883,657 B2
(45) Date of Patent: Nov. 11, 2014

(54) LATEX COATED HIGH PERFORMANCE POLYETHYLENE FABRICS

(71) Applicant: Ansell Healthcare Products LLC, Iselin, NJ (US)

(72) Inventors: Noorman Abu Hassan, Selangor (MY); Michael S. Zedalis, Mendham, NJ (US); Mohd Zabidi Bin Mohd Yasir, Selangor (MY); Eric Michael Thompson, Central, SC (US)

(73) Assignee: Ansell Healthcare Products LLC, Iselin, NJ (US)

( * ) Notice: Subject to any disclaimer, the term of this patent is extended or adjusted under 35 U.S.C. 154(b) by 130 days.

(21) Appl. No.: 13/716,606

(22) Filed: Dec. 17, 2012

(65) Prior Publication Data
US 2013/0152273 A1  Jun. 20, 2013

Related U.S. Application Data

(60) Provisional application No. 61/576,436, filed on Dec. 16, 2011.

(51) Int. Cl.
| B32B 27/06 | (2006.01) |
| B32B 27/32 | (2006.01) |
| A41D 19/00 | (2006.01) |
| B05D 1/18 | (2006.01) |

(52) U.S. Cl.
USPC .............. 442/71; 2/168; 428/500; 428/424.7; 428/424.8; 427/412; 427/342; 427/381; 427/389.9; 427/394

(58) Field of Classification Search
USPC ........... 428/424.7, 424.8, 500; 2/168; 442/71; 427/302, 342, 381, 389.9, 394, 412
See application file for complete search history.

(56) References Cited

U.S. PATENT DOCUMENTS

| 7,288,493 B2 * | 10/2007 | Bhatnagar et al. ............ 442/134 |
| 7,771,644 B2 | 8/2010 | Flather et al. |
| 7,971,275 B2 | 7/2011 | Saunders et al. |

(Continued)

FOREIGN PATENT DOCUMENTS

| JP | 03-269175 | 11/1991 |
| JP | 2001032115 A | 2/2001 |

(Continued)

OTHER PUBLICATIONS

International Search Report and Written Opinion mailed Apr. 26, 2031 for PCT Application No. PCT/US2012/070053.

Primary Examiner — Thao T. Tran
(74) Attorney, Agent, or Firm — Moser Taboada

(57) ABSTRACT

Provided among other things is a fabric comprising: a HPPE base fabric; coated thereon a primer polymer; and coated on the primer polymer a liquid-resistant polymer layer. The primer polymer can be a polyurethane. The base fabric can comprise an adhesion promoter that can be a plasticizer. The adhesion promoter can be a sulfonic acid plasticizer. The adhesion promoter can contain an active hydrogen, carboxy, carboxyloxy or acid group. The fabric can comprise, coated on the liquid-resistant polymer layer, an additional polymer layer. The additional polymer layer can comprise carnauba wax in an amount from about 1 to 3% Phr. The liquid-resistant polymer layer can be a NBR layer. In certain embodiments, the fabric shows no delamination of the liquid-resistant polymer layer after an adherence test. The primer layer can be a polyurethane layer. These features can be present in any combination.

20 Claims, 3 Drawing Sheets

(56) References Cited

U.S. PATENT DOCUMENTS

2007/0204381 A1* 9/2007 Thompson et al. .............. 2/159
2008/0017068 A1* 1/2008 Sokol et al. ................ 106/271
2010/0286314 A1* 11/2010 Chu et al. .................... 524/87
2013/0000005 A1* 1/2013 Hughes et al. .................. 2/16

FOREIGN PATENT DOCUMENTS

| KR | 10-0664645 B1 | 1/2007 | |
| KR | 100767452 B1 * | 11/2007 | ............. A41D 19/00 |
| WO | WO 2005/033229 A1 | 4/2005 | |

\* cited by examiner

LATEX COATED HIGH PERFORMANCE POLYETHYLENE FABRICS

The present application relates generally to protective articles such as gloves and other wearable items formed of high performance polyethylene fabrics and coated with liquid resistant polymer, such as latex.

High performance polyethylene (HPPE) fibers are produced by solution (gel) spinning of ultra-high molecular weight polyethylene (UHMW-PE) and possess unique mechanical properties in term of high strength to weight ratios and stiffness to weight ratios. Moreover these HPPE fibers possess relatively high work to break ratios, meaning they have good impact properties as compared with carbon, aramid and glass fibers. Due to these unique properties, HPPE fibers have been chosen for use in composite construction of glove liners, notably if good cut impact and damping properties are sought. Commercial HPPE liners include trade names such as Dyneema, Spectra and Tsunooga.

Unfortunately polyethylene is relatively chemically inert, making it difficult to achieve a good bond between the HPPE liner and a polymer coating. For example, a nitrile latex coating is believed to be prone to delamination.

This invention provides durable and flexible fabric, such as a glove, with a good chemical and mechanical adhesion of polymer coating to HPPE liner. In one aspect, a polyurethane polymeric primer coating is sandwiched between the HPPE and the polymer coating. With the polymer coating, a fabric can be designed to provide splash protection, such as at the back of palm. Liquid penetration can be blocked at the palm. The fabric can be designed to maintains grip in either dry, wet or oily environmental conditions, by utilizing textured surfaces on the polymer coating.

The fabric, such as a glove, can be designed to be soft and flexible to accommodate comfort and avoid fatigue to the user. Dexterity is also important; therefore the shape of the fabrics can be designed to snugly fitted to the user.

SUMMARY

Provided among other things is a fabric comprising: a HPPE base fabric; coated thereon a primer polymer; and coated on the primer polymer a liquid-resistant polymer layer. The primer polymer can be a polyurethane. The base fabric can comprise an adhesion promoter that can be a plasticizer. The adhesion promoter can be a sulfonic acid plasticizer. The adhesion promoter can contain an active hydrogen, carboxy, carboxyloxy or acid group. The fabric can comprise, coated on the liquid-resistant polymer layer, an additional polymer layer. The additional polymer layer can comprise carnauba wax in an amount from about 1 to 3% Phr. The liquid-resistant polymer layer can be a NBR layer. In certain embodiments, the fabric shows no delamination of the liquid-resistant polymer layer after an Adherence Test. The primer layer can be a polyurethane layer. These features can be present in any combination.

Provided among other things is a method of forming a polymer coated HPPE fabric comprising: applying a primer polymer layer to the HPPE fabric; and applying a liquid-resistant polymer layer to the primer polymer layer. The method can further comprise, prior to primer application, applying an adhesion promoter to the HPPE fabric. The adhesion promoter can comprise a plasticizer. The plasticizer can be a sulfonic acid plasticizer. The adhesion promoter can comprise plasticizer and C1-C4 alkyl ester of a C1-C6 acid. The adhesion promoter can comprise C1-C4 alkyl ester of a C1-C6 acid. The adhesion promoter contains an active hydrogen, carboxy, carboxyloxy or acid group. The primer polymer can be a polyurethane. The liquid-resistant polymer can be NBR. The method can further comprise, prior to primer application, applying an adhesion promoter to the HPPE fabric. These features can be present in any combination.

Provided among other things is a fabric such as a glove made by one of the methods described herein.

DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only illustrative embodiments of this invention and are therefore not to be considered limiting of its scope, for the invention may admit to other equally effective embodiments.

Figure 1:
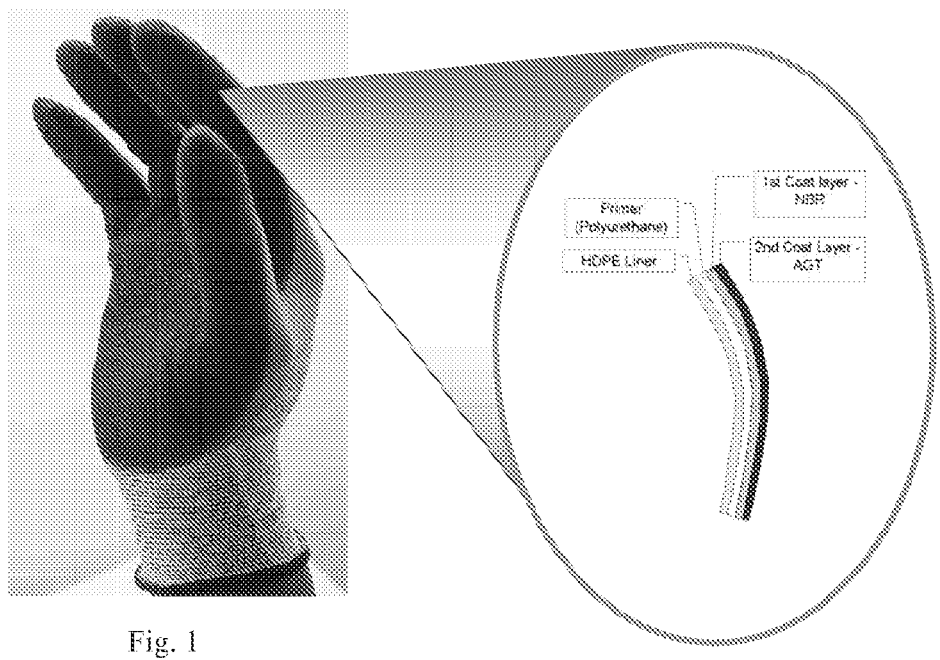
FIG. 1 depicts a fabric that is a glove according to the invention.

To facilitate understanding, identical reference numerals have been used, where possible, to designate comparable elements that are common to the figures. The figures are not drawn to scale and may be simplified for clarity. It is contemplated that elements and features of one embodiment may be beneficially incorporated in other embodiments without further recitation.

DETAILED DESCRIPTION

Illustrated in FIG. 1 is an illustrative fabric (illustrated as a glove) having a HPPE fabric layer (illustrated as a fabric liner), a primer layer, a $1^{st}$ polymer layer, and a $2^{nd}$ polymer layer. In the illustrative example, portions of the glove have just the liner, others have the liner plus $1^{st}$ polymer layer, and others have the liner plus both polymer coatings. Technically, the primer layer is a polymer layer, but since its primary function is to promote the adhesion of the $1^{st}$ polymer layer, we will adapt the convention of not naming it a numbered polymer layer. As illustrated, the optional $2^{nd}$ polymer layer can have texture formed on the exterior, for example to promote grip. One or more further polymer layers can be used.

The $1^{st}$ polymer layer serves as a liquid resistant layer. The layer may resist water, and/or may resist a range of solvents.

The polymer layer(s) and primer layer are typically applied as latexes, though the coatings can be applied by other processes such as dipping, lick-rolling, spraying or brushing. Latex processes for the primer and a $1^{st}$ polymer layer are typically enhanced by using a coagulant. Examples of suitable latexes for the $1^{st}$ and $2^{nd}$ polymer layer include, for example, carboxylated acrylonitrile butadiene, non-carboxylated acrylonitrile butadiene, butyl latex, polychloroprene, natural rubber, synthetic polyisoprene, polyurethane, and mixtures thereof. A useful polymer is acrylonitrile butadiene rubber (NBR). A polymer layer will be deemed NBR if its polymer component is 51% or more acrylonitrile butadiene rubber by weight. In certain embodiments NBR layers are 55% or 60% or more acrylonitrile butadiene rubber (by weight of polymers).

The primer layer is formed of a polymer capable of adhering to a low activity surface, such as formed of an alkane, and also a surface of mixed character, such as a typical latex-formed polymer surface. Examples include without limitation polyurethanes, acrylics, chlorinated polyethylene and reactive epoxies. Primer coatings are typically relatively thin. For latex processes, this thinness is achieved with relatively low concentrations of aqueous polymer, such as about 4 to about 15% by weight polymer. In certain embodiments, the primer layer is about 1 mil (0.025 mm) to about 3 mil (0.075 mm) thick. In certain embodiments, the primer layer is about 1.5 mil (0.038 mm) to about 2 mil (0.050 mm) thick. Useful polyurethanes include for example an aqueous dispersion of hydroxyl functional pre-polymer obtained by reaction of a polyol component containing either a polyester polyol or polyether and polyester polyol mixtures, a compound containing groups capable of salt formation and at least two isocyanate reactive groups and an isocyanate component in a stoichemetric excess, at least 20% by weight of said isocyanate component based on an aliphatic diisocyanates such as isophorone diisocyanate and tetramethylxylene diisocyanate to form an initial pre-polymer, and subsequent dispersion in water, and at least partial reaction of the remaining NCO groups with an amino alcohol and subsequent chain extension. A polyurethane layer includes 80% or more polyurethane polymer content by weight or more.

The liner can be of rugged construction adapted to good mechanical anchorage for the polymer coating. For example, the liner can be formed with a regular undulation along the length of liner in the form of uniplanar and regular crimp construction that resembles a sine wave imparting a helix twist to the plurality of uniplanar braided HPPE yarn alternate with regular nylon crimp knit pattern.

In the coagulant method, the coagulant solution can include one or more adhesion promoters. In certain embodiments, adhesion promoter is applied to the base fabric whether or not a coagulant method is utilized. In certain embodiments, the adhesion promoter is an ester capable of providing some alkylating activity. In certain embodiments, it is a C1-C4 alkyl ester of a C1-C6 acid. In certain embodiments, the acid is an alpha-hydroxy acid, such as lactic acid. In certain embodiments, the adhesion promoter is a plasticizer. In certain embodiments, the adhesion promoter is a sulfonic acid plasticizer. In certain embodiments, the adhesion promoter is a mixture of C1-C4 alkyl ester of a C1-C6 acid and a sulfonic acid plasticizer. In certain embodiments, the adhesion promoter contains an active hydrogen, carboxy, carboxyloxy or acid group, such as hydroxyl, mercapto, carboxylic acids and sulfonic acid derivatives.

Materials that can be chemically etched to the HPPE fibers can be used a adhesion promoters, and include compounds containing active hydrogens and acid groups such as hydroxyl, mercapto and carboxylic acids. Examples include dimethylol propionic acid, glycolic acid, thioglycollic acid, lactic acid, mallic acid, dihydroxy malic acid, tartaric acid, dihydroxy tartaric acid, and 2,6 dehydroxy-benzoic acid. Other examples of compounds that contain active hydrogens and acid groups are aminohydroxy carboxylic acids, aminohydroxy carboxylic acids, sulfonic acid derivatives including sulfonic acid esters, hydroxyl sulfonic acid derivatives, and aminosulfonic acids. Specific examples of these include oxaluric acid, anilido acetic acid, glycine, alpha-alanine, 6 amino caproic acid, reaction product of ethanolamine and acrylic acid, hydroxylethyl propionic acid, 2 hydroxyethane sulfonic acid, phenyl cresyl esters of pentadecyl sulfonic acid, esters of lactic acid, sulphanilic acid, and the like.

Useful as adhesion promoters include ester-containing alkylation agents effective to render both hydrophilic and hydrophobic surfaces capable of bonding with aliphatic amines in polyurethane through hydrogen bonds or other polar interactions. Useful materials include for example phenyl cresyl esters of pentadecyl sulfonic acid marketed under tradename Messamoll® and ethyl lactate marketed under tradename Purasol. These reagents are believed to enhance affinity for bonding to the HPPE liner as well as improve surface wettability.

Without being bound by theory, it is believed that alkylating esters act to slightly etch the HPPE liner surface to improve adhesion and enhance solubility of primer upon contact with the HPPE liner.

Without being bound by theory, it is believed that sulfonic acid ester plasticizer, when present in the polyurethane primer and the 1st polymer layer, not only improves bonding adhesion between the two polymers but also plasticizes and softens the two polymer layers for excellent flexibility and dexterity on the coated HPPE liner. An optional further (e.g., outer) polymer coating can be without the presence of sulfonic acid ester plasticizer to limit high saturation with plasticizers that could cause delamination at the outer coatings interface.

Mechanical surface treatments can be used, such as roughening the HPPE liners through rugged construction to assist mechanical anchorage, chemical treatments such as application of either chlorinated polyolefine such as Hauthane® and Bondthane, or acrylic copolymer coating such as Envithane® and Carbobond® to the surface of HPPE liner. Chemical treatments can be used to modify the physical structure include such as by acid etching, anodizing, cleaning or leaving an activator on the surface.

In the illustration of FIG. 1, $1^{st}$ polymer layer provides the liquid repellency (liquid impermeability) at the palm area. To obtain splash protection at the back of palm, the $1^{st}$ polymer layer is dipped 2.5-3 cm above the $3^{rd}$ knuckle. Texturized salt treatment on the $2^{nd}$ polymer layer according to U.S. Pat. No. 7,771,644 (incorporated by reference in its entirety) provides texture for dry, wet and oil grip properties. In one embodiment, the second polymer layer is enhanced with about 1-3% (or 1-3 Phr) of a high melting point wax such as carnauba wax to improve abrasion resistance. (Phr—Parts per hundred of rubber.)

In certain embodiments, the fabric is constructed with composite 13 g or 15 g of 400d HPPE and 70d Nylon yarn based on AIO former shape, with approximate total deniers 500-700. In certain embodiments, the fabric incorporates multi variable plaiting (MVP) technology, which comprises for example nylon and spandex for improving snug fit and comfort. The HPPE fabric (e.g. knitted) at both front and back palm and fingers areas can be rugged in construction to give mechanical anchorage to the coated polymers in addition to chemical anchorage.

A fabric is a HPPE fabric if made of a yarn that is primarily a HPPE yarn, or in some embodiments 57% (by denier) or more HPPE. Ancillary stitching, such as plaiting, is not included in this calculation.

To provide flexibility and comfort to the glove construction, the 1st layer polymer can be adapted to be soft and flexible. The formulation can be comprised of latex, curative dispersion pigment and thickener. The flexibility can be achieved by incorporating flexible elastomeric emulsion such as a terpolymer emulsion (e.g., Hystretch® terpolymer). Elastomeric polymer can be for example about 15 to 40% wt of polymer content. The primary polymer can be about 60 to 85% wt of polymer content. Ester based plasticizer can be added as an extender for improving further the flexibility of the 1st polymer layer. Leveling and flow modifier agent can be added to achieve uniformity and overcome potential crack and holes. Leveling agent and flow modifier can be comprised of acrylic or cellulose based materials such as Metolose®, Additol®, Modaflow®, Culminal®, Rohagit®, and the like. In certain embodiments, compound viscosity of the latex for the $1^{st}$ polymer coating is controlled within 2000-4000 cps.

The base fabric can include an adhesion promoter that is a plasticizer. Without being bound by theory it is believed that when an adhesion promoter that is a plasticizer is applied, pursuant to the invention, to HPPE base fabric by a process that yields a high local concentration (such as by drying), then the concentration of plasticizer in the fabric is higher than what would leach out of covering polymer layers that comprise plasticizer.

An exemplary dipping process is started by loading the base fabric (e.g., liner) onto former. It should preferably be ensured that the base fabric is fit and sits nicely on the former in order to help avoid penetration of $1^{st}$ polymer layer latex. Coagulant is applied, for example through a known technique such as dipping or spraying. The coagulant should be uniformly coated (where needed) and sufficiently dried prior to primer dipping process in order to limit coagulant wash off into primer, which can result in flocking and lump. The drying process can be done by a number of methods such as IR, hot air blowing or the like. Coagulant is believed to provide coagulating function for both the primer and the $1^{st}$ polymer layer. Subsequent to that, primer is applied onto base fabric to facilitate bonding of the $1^{st}$ polymer layer. A low concentration of primer polymer helps ensure uniform coating and good adhesion of $1^{st}$ coat to liner. After the primer dipping, normally the primer will be dried in pointing down as well as pointing up position as to ensure free flow of primer to obtain uniform coating. Once the primer is sufficiently dried, the $1^{st}$ polymer can for example be dipped. Again, former orientation is manipulated in pointing down and up position in order to obtain uniform coating of $1^{st}$ coat nitrile.

In certain embodiments, one or more subsequent polymer layers are applied. Leaching generally follows polymer application for removing residue and cleaning the glove. Finally the fabric is cured, for example at 90-140° C. for 1-3 hours before stripping.

An exemplary coagulant formulation is as follows:

TABLE 1

Formulation of coagulant

| % TSC | Materials | Part (w/w) |
|---|---|---|
| 78 | Calcium nitrate | 5-10 |
| 100 | $1^{st}$ adhesion promoter | 0.1-0.5 |
| 50 | $2^{nd}$ adhesion promoter (if present) | 0.8-1.5 |

In certain embodiments, the $1^{st}$ adhesion promoter is C1-C4 alkyl ester of a C1-C6 acid. In certain embodiments, the $2^{nd}$ adhesion promoter is a plasticizer. In certain embodiments, the $2^{nd}$ adhesion promoter is a sulfonic acid plasticizer. In certain embodiments, the primer includes a C1-C4 alkyl ester of a C1-C6 acid, and the $1^{st}$ polymer includes a distinct adhesion promoter. In certain embodiments, the primer layer includes a C1-C4 alkyl ester of a C1-C6 acid, and the $1^{st}$ polymer layer includes a sulfonic acid plasticizer. In certain embodiments, the primer layer includes a C1-C4 alkyl ester of a C1-C6 acid and a sulfonic acid plasticizer, and the $1^{st}$ polymer layer includes a sulfonic acid plasticizer. Examples of coagulant formulations include:

TABLE 2

Formulation of coagulant

| % TSC | Materials | Part (w/w) |
|---|---|---|
| 78 | Calcium nitrate | 7 |
| 100 | Ethyl lactate | 0.3 |

TABLE 3

Formulation of coagulant

| % TSC | Materials | Part (w/w) |
|---|---|---|
| 78 | Calcium nitrate | 7 |
| 100 | Ethyl lactate | 0.3 |
| 50 | $2^{nd}$ Adhesion promoter | 1 |

Figure 2:
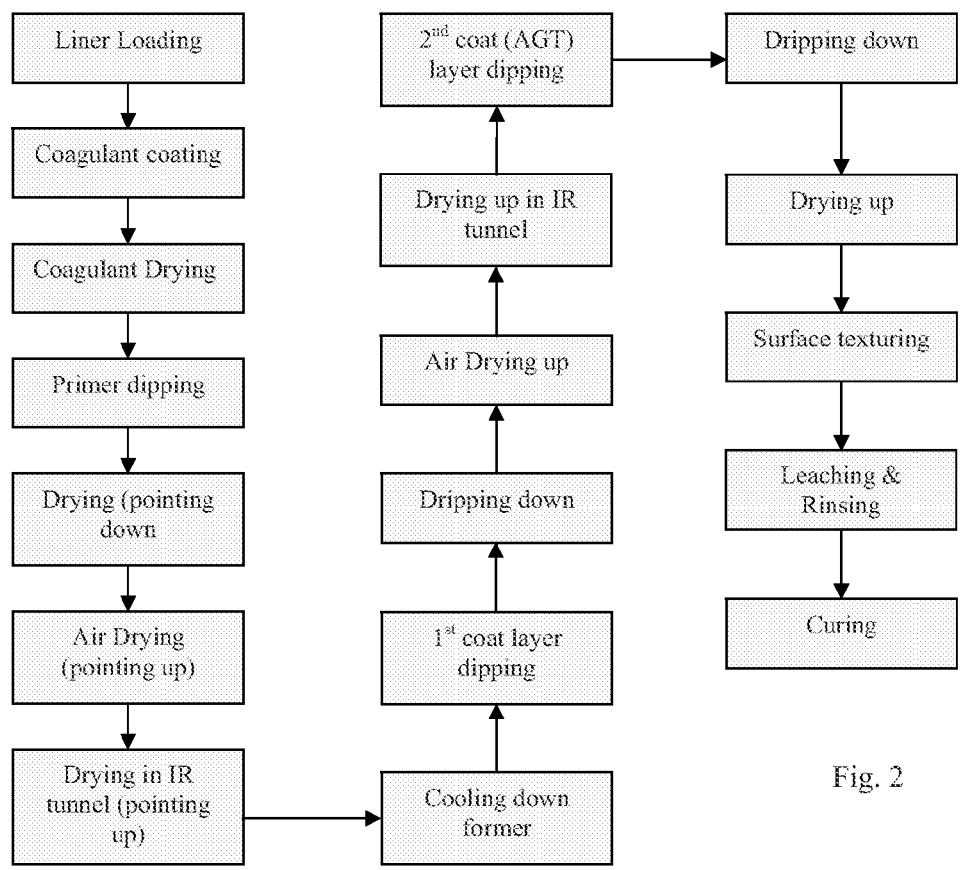
FIG. 2 is a flow chart for a particular embodiment of the invention.
Figure 3A:
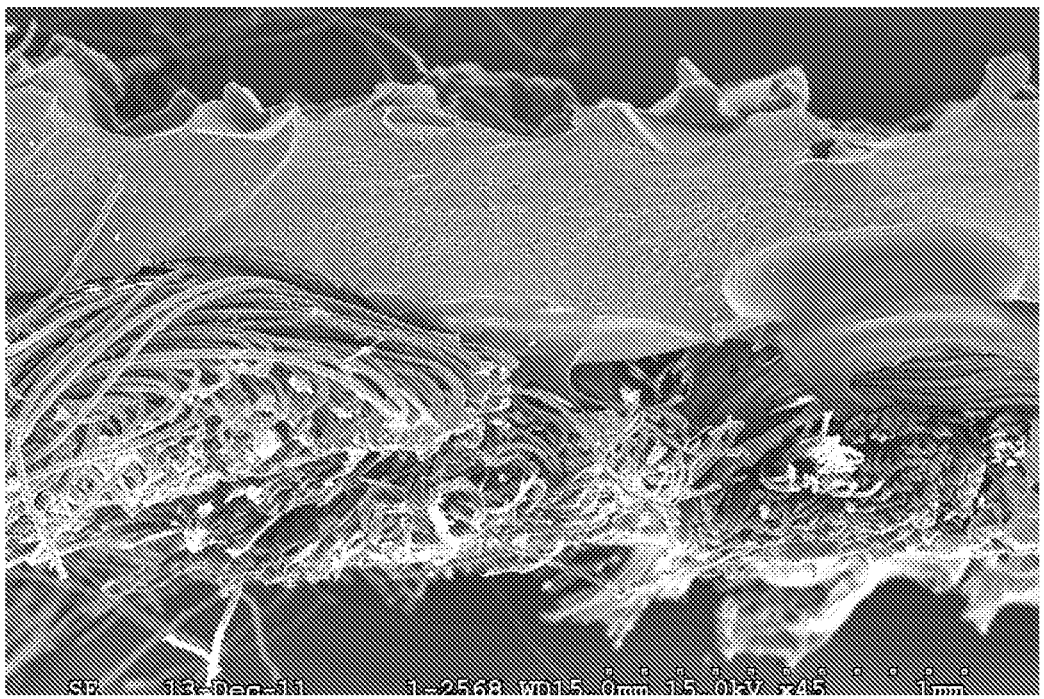
FIGS. 3A, 3B, 3C and 3D depict scanning electron microscopic (SEM) photomicrographs of glove cross-sections.
Figure 3B:
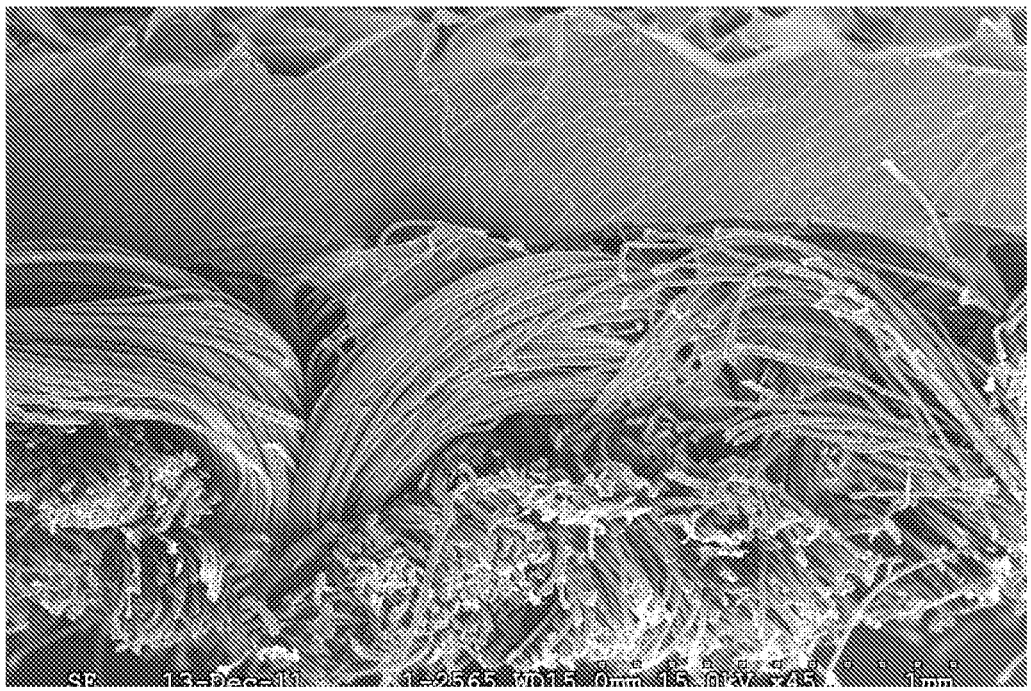
Figure 3C:
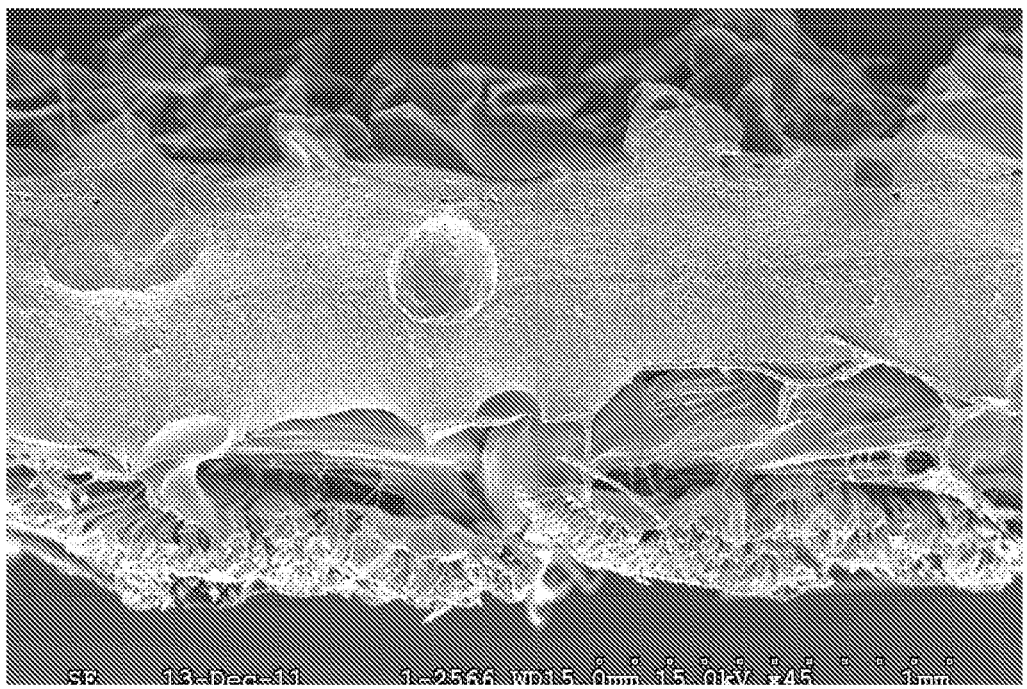
Figure 3D:
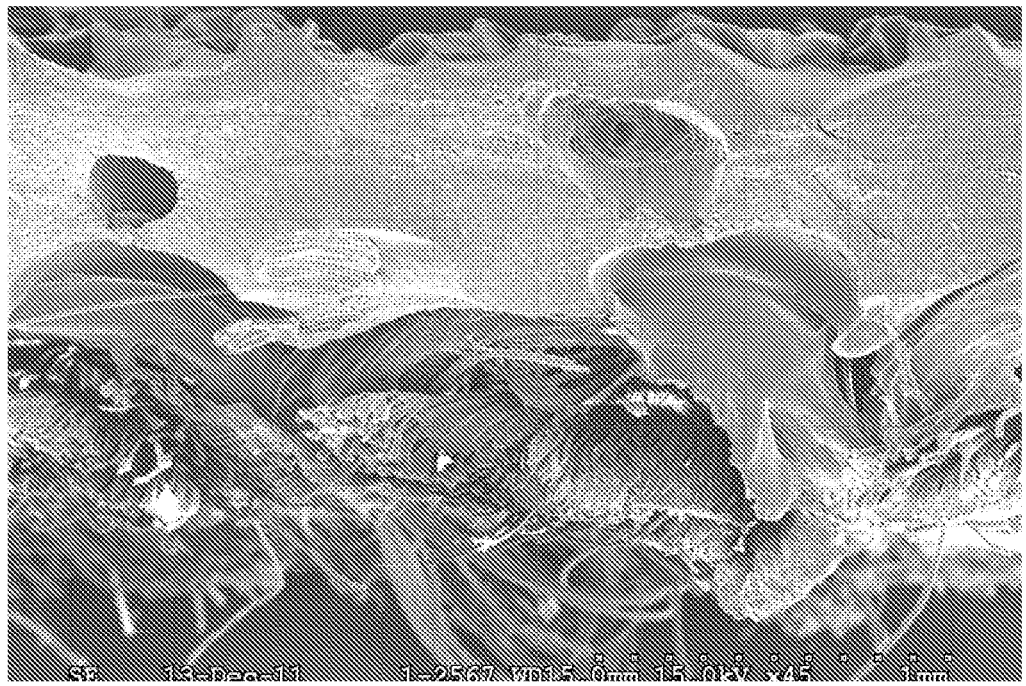

The process can be: applying primer on a coagulant infused base fabric; and applying $1^{st}$ polymer layer. In dipping processes, there will typically be drying and curing steps. For example, the process can be as in FIG. 2.

An example of the primer formulation includes:

TABLE 4

Formulation of primer

| % TSC | Materials | wt % |
|---|---|---|
| 40 | Polyurethane | 4-15 |
| 50 | Adhesion promoter | 5-12 |
|  | Triethylamine (TEA) | As needed |

In certain embodiments, the pH of the primer formulation is adjusted to pH 9 or above, or to about pH 9-10. In certain embodiments, adhesion promoter in the primer formulation is about 5 to 12% wt.

An exemplary formulation for forming the $1^{st}$ polymer layer can be as follows:

TABLE 5

Formulation of $1^{st}$ Layer

| % TSC | Materials | Phr |
|---|---|---|
| 44 | Nitrile latex | 100 |
| 30 | Ammonia solution | 0.10-0.5 |
| 50 | Curative dispersion | 1.00-2.00 |
| 64 | Pigment | 0.3-0.6 |
| 100 | Leveling agent | 0.2-0.8 |
| 100 | Flow modifier | 0.2-0.8 |
| 50.5 | Polyurethane terpolymer | 25-35 |
| 70 | $TiO_2$ dispersion | As needed |
| 50 | Plasticizer | 5-10 |
| 6 | Thickener | As needed |

The plasticizer in Table 5 can be a sulfonic acid plasticizer. Plasticizer can be in certain embodiments about 5 to 10 Phr.

An exemplary formulation for forming the $2^{nd}$ polymer layer can be as follows:

TABLE 3

Formulation of compound base 2

| % TSC | Materials | Phr |
|---|---|---|
| 44 | Nitrile latex | 100 |
| 30 | Stabilizer | 0.2-0.7 |

TABLE 3-continued

Formulation of compound base 2

| % TSC | Materials | Phr |
|---|---|---|
| 50 | Curative dispersion | 1.5-2.5 |
| 45 | Pigment | As needed |
| 25 | Carnauba wax | 1.0-3.0 |
| 6 | Thickener | As needed |

To test whether the $1^{st}$ polymer coating has good adherence, three cycles of the of washing are conducted on fabrics. FIGS. 3A, 3B, 3C and 3D depict respectively scanning electron microscopic (SEM) photomicrographs of glove cross-sections after being subjected to zero (control), one cycle, two cycles and three cycles of hot laundry washings. As shown, fiber adhesion is still intact with no sign of failure or delamination gap between coatings and HPPE fibers for all the three cycles.

In one embodiment, the wash cycles (three making up the "Adhesion Test") are conducted using a Whirlpool Duet Model GHW9200LW/Q operating on a Normal/Casual Cycle (wash time 45 min), with the wash cycle temperature at approximately 50° C., and spin speed 1,000 rpm. In certain embodiments, the washing machine is substituted with one that provides substantially the same wear and temperature stress.

In certain embodiments, the $1^{st}$ polymer layer does not show indications of delamination (e.g., indicative wrinkling) after the Adherence Test.

When the invention is utilized for gloves, a useful coating of the $1^{st}$ polymer layer is of the palm, fingers, and a substantial portion of the back of the hand (e.g., 2.5-3 cm above the $3^{rd}$ knuckle, where the wrist is above the knuckle)("¾ dipping"). The $2^{nd}$ polymer layer can be of the palm and/or lower surfaces of the fingers.

All ranges recited herein include ranges therebetween, and can be inclusive or exclusive of the endpoints. Optional included ranges can be from integer values therebetween, at the order of magnitude recited or the next smaller order of magnitude. For example, if the lower range value is 0.2, optional included endpoints can be 0.3, 0.4, . . . 1.1, 1.2, and the like, as well as 1, 2, 3 and the like; if the higher range is 8, optional included endpoints can be 7, 6, and the like.

Embodiments of the invention include:

A. A fabric comprising:
a HPPE base fabric;
coated thereon a primer polymer; and
coated on the primer polymer a liquid-resistant polymer layer.

B. The fabric of embodiment A, wherein the primer polymer is a polyurethane.

C. The fabric of one of the foregoing embodiments, wherein the base fabric comprises an adhesion promoter that is a plasticizer.

D. The fabric of embodiment C, wherein the adhesion promoter is a sulfonic acid plasticizer.

E. The fabric of embodiment C, wherein the adhesion promoter contains an active hydrogen, carboxyl, carboxylic acid or acid groups'.

F. The fabric of one of the foregoing embodiments, formed as a glove.

G. The glove of embodiment F, further comprising:
coated on the liquid-resistant polymer layer, an additional polymer layer.

H. The glove of embodiment G, wherein the additional polymer layer comprises carnauba wax in an amount from about 1 to 3% Phr.

I. The fabric or glove of one of embodiments A-G or H, wherein the liquid-resistant polymer layer is a NBR layer.

J. The fabric of one of embodiments A-E or F, showing no delamination of the liquid-resistant polymer layer after a Adherence Test.

K. The fabric of embodiment J, wherein the liquid-resistant polymer layer is a NBR layer.

L. The fabric of embodiment K, wherein the primer layer is a polyurethane layer.

M. A method of forming a polymer coated HPPE fabric comprising:
applying a primer polymer layer to the HPPE fabric; and
applying a liquid-resistant polymer layer to the primer polymer layer.

N. The method of embodiment M, further comprising; prior to primer application, applying an adhesion promoter to the HPPE fabric.

O. The method of embodiment N, wherein the adhesion promoter comprises a plasticizer.

P. The method of embodiment O, wherein the plasticizer is a sulfonic acid plasticizer.

Q. The method of embodiment N, wherein the adhesion promoter comprises plasticizer and C1-C4 alkyl ester of a C1-C6 acid.

R. The method of embodiment N, wherein the adhesion promoter comprises C1-C4 alkyl ester of a C1-C6 acid.

S. The method of embodiment N, wherein the adhesion promoter contains an active hydrogen, carboxy, carboxyloxy or acid group.

T. The method of one of embodiments M-R or S, wherein the primer polymer is a polyurethane.

U. The method of one of embodiments M-R or S, wherein the applying is by coagulant-mediated dipping, the primer polymer is a polyurethane, and the liquid-resistant polymer is NBR.

V. A fabric such as a glove made by one of the foregoing methods.

This invention described herein is of a coated HPPE base fabric and methods of forming the same. Although some embodiments have been discussed above, other implementations and applications are also within the scope of the following claims. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the following claims.

Publications and references, including but not limited to patents and patent applications, cited in this specification are herein incorporated by reference in their entirety in the entire portion cited as if each individual publication or reference were specifically and individually indicated to be incorporated by reference herein as being fully set forth. Any patent application to which this application claims priority is also incorporated by reference herein in the manner described above for publications and references.

What is claimed is:
1. A delamination resistant fabric comprising:
a base fabric that is primarily high performance polyethylene (HPPE);
coated thereon is a primer polymer coating formed from a composition containing about 4 to about 15% by weight of the primer polymer; and coated on the primer polymer coating is a liquid-resistant polymer layer, wherein the fabric resists delamination from the liquid-resistant polymer layer as measured by an Adhesion Test.

2. The fabric of claim 1, wherein the primer polymer is a polyurethane.

3. The fabric of claim 2, wherein the base fabric comprises an adhesion promoter that is a plasticizer.

4. A glove, comprising the fabric of claim 1, said fabric formed as the glove.

5. The fabric of claim 1, wherein the liquid-resistant polymer layer is a acrylonitrile butadiene rubber (NBR) layer.

6. The delamination resistant fabric of claim 1, wherein the primer polymer coating has a thickness from about 1 mil to about 3 mil.

7. The delamination resistant fabric of claim 1, wherein the fabric consists of HPPE, nylon and elastomer.

8. The glove of claim 4, further comprising:
coated on the liquid-resistant polymer layer, an additional polymer layer.

9. The glove of claim 8, wherein the additional polymer layer comprises carnauba wax in an amount from about 1 to 3% Phr, effective to improve abrasion resistance.

10. A method of forming a delamination resistant, polymer coated HPPE fabric comprising:
applying by aqueous dip coating a primer polymer layer to the high performance polyethylene (HPPE) fabric, wherein the primer polymer is applied in a composition containing about 4 to about 15% by weight of the primer polymer; and
applying a liquid-resistant polymer layer to the primer polymer layer; and
the polymer coated fabric is cured, wherein the resultant fabric resists delamination from the liquid-resistant polymer layer as measured by an Adhesion Test.

11. The method of claim 10, further comprising;
prior to primer application, applying an adhesion promoter to the HPPE fabric, wherein the adhesion promoter comprises a compound containing an active hydrogen or an acid group, a plasticizer, or an ester-containing alkylating agent.

12. The method of claim 11, wherein the adhesion promoter comprises a sulfonic acid ester plasticizer.

13. The method of claim 10, wherein the primer polymer is a polyurethane.

14. The method of claim 13, further comprising;
prior to primer application, applying an adhesion promoter to the HPPE fabric, wherein the adhesion promoter comprises a compound containing an active hydrogen or an acid group, a plasticizer, or an ester-containing alkylating agent.

15. The method of claim 14, wherein the adhesion promoter applied to the HPPE fabric comprises a sulfonic acid ester plasticizer.

16. The method of claim 14, wherein the adhesion promoter comprises plasticizer and C1-C4 alkyl ester of a C1-C6 acid.

17. The method of claim 14, wherein the adhesion promoter comprises C1-C4 alkyl ester of a C1-C6 acid.

18. The method of claim 14, wherein the applying is a coagulant-mediated dipping, the primer polymer is a polyurethane, and the liquid-resistant polymer is acrylonitrile butadiene rubber (NBR).

19. The method of claim 18, further comprising:
prior to primer application, applying an adhesion promoter to the HPPE fabric.

20. The method of claim 19, wherein the adhesion promoter comprises a sulfonic acid ester plasticizer.

* * * * *